(12) United States Patent
Szydlo

(10) Patent No.: US 8,156,029 B2
(45) Date of Patent: Apr. 10, 2012

(54) PROCESS FOR VERIFIABLY COMMUNICATING RISK CHARACTERISTICS OF AN INVESTMENT PORTFOLIO

(76) Inventor: Michael Gregory Szydlo, Allston, MA (US)

( * ) Notice: Subject to any disclaimer, the term of this patent is extended or adjusted under 35 U.S.C. 154(b) by 1277 days.

(21) Appl. No.: 11/360,648

(22) Filed: Feb. 23, 2006

(65) Prior Publication Data

US 2006/0190378 A1     Aug. 24, 2006

Related U.S. Application Data

(60) Provisional application No. 60/656,045, filed on Feb. 24, 2005.

(51) Int. Cl.
*G06Q 40/00* (2012.01)
(52) U.S. Cl. ............ 705/36 R; 705/38; 705/36; 705/35
(58) Field of Classification Search .................. 705/36, 705/36 R, 38
See application file for complete search history.

(56) References Cited

U.S. PATENT DOCUMENTS

| 2002/0049601 A1* | 4/2002 | Asokan et al. ............... 705/1 |
| 2003/0182230 A1* | 9/2003 | Pessin ........................... 705/39 |
| 2005/0171882 A1* | 8/2005 | Nevins ........................... 705/36 |

OTHER PUBLICATIONS

Hans k, Kaufman R J, Nault B.R. innovator or owner ? Information sharing, incomplete contracts and governance in financial risk management systems. Jan. 8, 2004; IEEE comput . Soc, CA; 10 pp; ISBN: 0-7695-2056-1.*

* cited by examiner

*Primary Examiner* — Ella Colbert
*Assistant Examiner* — John Anderson
(74) *Attorney, Agent, or Firm* — Seyfarth Shaw LLP; John C. Serio

(57) ABSTRACT

In accordance with a preferred embodiment of the invention, there is disclosed a process for verifiably communicating risk characteristics of an investment portfolio to an investor without disclosing the exact composition of the portfolio comprising: A procedure for the investment manager to describe acceptable characteristics of an investment portfolio within the portfolio's prospectus, An algorithm and procedure for the investment manager to cryptographically commit to portfolio contents without disclosing the exact composition, An algorithm and procedure to calculate the risk statistics concerning the limitations specified in the prospectus concerning the acceptable configurations of assets holdings without disclosing the exact composition, An algorithm and procedure employing cryptographic means to prove that each such statistic is within the numerical range specified in the prospectus, An algorithm and procedure to check the validity of proofs claiming that each statistic is within a particular range, and A set of procedures involving one or more third parties to provide assistence, including sending the commitments for portfolio contents to a court or to a regulatory body in case of dispute.

30 Claims, 10 Drawing Sheets

- Manifestation without zero knowledge

- Basic System Components

PROCESS FOR VERIFIABLY COMMUNICATING RISK CHARACTERISTICS OF AN INVESTMENT PORTFOLIO this application claims priority to U.S. Provisional Patent Application Ser. No. 60/656,045 filed Feb. 24, 2005.

FIELD OF THE INVENTION

This invention relates generally to the field of financial risk management and more specifically to a process for verifiably communicating risk characteristics of an investment portfolio to an investor without disclosing the exact composition of the portfolio.

This invention also relates to the fields of portfolio management, investment risk modeling, financial derivative engineering, accounting, auditing, and fraud prevention, as well as to the field of cryptographic zero-knowledge proof systems.

BACKGROUND OF THE INVENTION

This invention describes a novel application of cryptographic commitments and zero-knowledge techniques to the relationship between and investor and a portfolio manager. The interest of the portfolio manager is in earning high returns, so he may want to keep his exact portfolio and trading strategy secret. An investor, on the other hand, also requires mechanisms to ensure the honesty of the managers, and to check that the fund's risk characteristics are in line with his own risk preferences. This invention addresses the fundamental problem of how to control the flow of risk information to serve these distinct interests. We suggest that the tool described herein is particularly suited to hedge funds, which tend to be highly secretive and more loosely regulated, and whose risk characteristics may not be evident to the investor.

Comparison with Earlier Work: Cryptography has been applied to financial transactions before, in generic ways—for example, to enhance privacy or integrity of data—and in ways specific to transactions, for example, digital cash, and auction design. The cryptographic tools of commitment and zero-knowledge proofs have been used as components in identification schemes and digital signatures, and zero-knowledge proofs have also appeared as components in multi-party computations such as auctions. Within the financial sector, cryptography has been used to protect the integrity of transactional data, and to facilitate the transactions themselves. Additionally, cryptographic techniques have appeared as components of payment schemes, including digital cash. However, zero-knowledge proofs have never directly been used before as a component of a system to help ensure that an investment fund contains risk characteristics which are acceptable to an investor.

Previous work has provided security for financial transactions themselves. The present invention concerns the use of cryptographic techniques to allow a more finely-controlled release of financial information from an investment portfolio manager to an investor.

Similarly, there has been significant work in the field of financial risk modeling, and, for example, the construction of statistical models which describe how a portfolio's value depends on a set of economic factors in a set of hypothetical future scenarios. It is also in common practice to make risk characteristics of a portfolio available to an investor. Regardless of the financial models used, traditional methods of risk communication have not yet made use of cryptographic proof techniques to support the validity of the claimed risks, or as a tool to help prevent fraud.

The present invention may make use of standard cryptographic tools such as Pedersen Commitments and Interval Proofs. Similarly, the invention may make use of the financial risk tools of factor analysis and scenario analysis. This invention is new because it combines the two components in a non-obvious manner, to provide a new tool for the investor manager relationship. As background for the invention, we first review the mechanics of these tools and show how to assemble them into (zero knowledge) statements which are meaningful to the investor. For simplicity, we stick to well-known building blocks describing the invention, but do not wish to limit the scope of the invention to any particular cryptographic primitive, or financial model. We continue with the finance background.

Portfolios and Risk: Investors and fund managers have different interests with respect to release of information. An investment portfolio is just a collection of assets designed to store or increase wealth. In a managed fund, the investor turns over capital to a fund manager, an investment professional who buys, sells, and otherwise maintains the portfolio in return for a fee or commission. The assets often contain publicly-traded securities such as stocks, bonds, commodities, options, currency exchange agreements, mortgages, "derivative" instruments, as well as less liquid assets such as real estate, or collectibles. Examples of managed funds are pension funds, 401K plans, mutual funds, and hedge funds.

Every type of investment contains uncertainty and risk. Ultimately, the risk inherent in investments derives from the fact that the future market value depends on information which is not available: information concerning either unknown future events, or information concerning past events which has not been publicly disclosed or effectively analyzed. The charter of the fund manager is to manage these risks in accordance with the preferences of the investor.

Risk Factors: The finance profession has developed a plethora of models to define and estimate portfolio risks. A first description of a portfolio's risks includes a breakdown of the types of assets in the fund such as the proportion of capital invested in equity, debt, foreign currency, derivatives, and real estate. A further breakdown specifies the allocation by industry type or sector, or region for foreign investments.

The future value of an investment depends on such future unknown factors as corporate earnings for stocks, interest rates and default likelihood for bonds, monetary policy and the balance of trade for foreign currency, regional political stability for any foreign investment, re-financing rates for securitized mortgages, housing demand for real estate, etc.

Risk models identify such measurable risk factors, and study the dependence of the asset's value on each factor. Such factor exposures are estimated with statistical regression techniques, and describe not only the sensitivity to the factor but also how the variance, or volatility of a security depends on such correlated factors. Assembling such analysis for all securities in a portfolio, the fund manager has a method for quantatively understanding the relative importance of the risk factors his portfolio is exposed to. Another important tool, scenario analysis, is used to estimate the future value of a portfolio under a broad range of hypothetical situations.

Hedge Funds: To hedge against a risk is effectively to buy some insurance against an adversarial event. When two assets depend oppositely on the same risk factor, the combined value of the pair is less sensitive to that factor. A hedge fund is just a type of portfolio designed to have certain aggregate risk characteristics. Hedge funds may use leveraging techniques such as statistical arbitrage, i.e.—engaging in long and short positions in similarly behaving securities, hoping to earn a profit regardless of how the correlated securities behave.

Hedge funds are often large private investments and are more loosely regulated than publicly offered funds. (e.g., they need not register with the SEC). Such extra flexibility affords the possibility of exceeding the performance of more standard funds. For example, hedge funds often take a position contrary to the market consensus, effectively betting that a certain event will happen. When accompanied by superior information or analysis such bets can indeed have high expected value. Of course, highly leveraged funds can be extremely sensitive to a particular risk factor, and are thus also susceptible to extreme losses.

The high investment minimums, lax regulation and secrecy or "black box" nature of hedge funds has fostered an aura of fame and notoriety through their spectacular returns, spectacular losses, and opportunities for abuse. Recently, though, there has been interest in marketing hedge funds as viable opportunities for the average investor.

The Role of Information

Information and Asset Prices: A market assigns a value to an asset based on the prices in a steady steam of transactions. The information perceived to be relevant to the asset's value is compared to existing expectations and drives the supply, demand, and market price. The pivotal role of information is embodied in the efficient market hypothesis which states that if everyone has the same information, the collective brainpower of investors will reduce arbitrage opportunities, and force the market price to an equilibrium.

In the real world, not everyone has the same information, and the information asymmetries among parties significantly affect the behavior of asset prices in the market. The situation is worse for illiquid assets, for which one must rely on some adhoc fundamental analysis to estimate the value. Similarly, it is difficult to assign a robust value to an investment fund with opaque risk characteristics (such as a hedge fund). A greater knowledge of the actual risk profile of hedge funds would increase their usefulness in funds of funds, for example.

The Importance of Secrets: Certain investments, such as passive funds which track an index may have no requirement to protect the portfolio contents or trading patterns. Actively traded funds, on the other hand, have good reasons to maintain secrets. For example, revealing in advance an intention to purchase a large quantity of some security would drive the price up. A parallel can be made with corporations: Sharing technological, financial, and trade secrets would undermine the competitive advantage of a firm.

Especially relevant to our focus, if a hedge fund were exploiting a subtle but profitable arbitrage opportunity, revealing this strategy would quickly destroy the benefit, as other funds would copy the strategy until it was no longer profitable. Thus, a rational investor will support such constructive use of secrets.

The Importance of Transparency: Secrecy is also dangerous. The actions of a fund manager might not aim to create value for the investor! The danger of too much secrecy is that it also reduces barriers to theft, fraud, and other conflicts of interest. An example of corrupt behavior that might be discouraged by increased transparency is the practice of engaging in unnecessary trading motived by brokerage commissions. To combat this risk, individual investors require enough access to information about a company or fund to help ensure honest management, consistent with the creation of value.

Another kind of problem will arise if the investor is not aware of the kinds of risks his portfolio is exposed to. In this case it is impossible to tell if these risks are in line with his preferences. A fund manager might be motivated by a fee structure which encourages him to take risks that are not acceptable to the investor. When the fee structure or actual level of risk in the portfolio is not evident to the investor, a fund manager may legally pursue actions consistent with interests other than the investor's.

Aligning Interests: The above discussion concerning just how much risk information should be kept secret and how much should be revealed shows how difficult it is in practice to perfectly align the interests of investors and fund managers. The traditional approaches to mitigating this problem involve financial regulatory bodies such as the SEC, which seeks to institute reporting laws and support capital requirements that protect the investor, ideally without imposing too large a burden on the financial institution. In the case of hedge funds, the position of the SEC is that the interests of the investor are not adequately protected. Indeed, it has not been able to eliminate all fraud and conflict of interests arising in the context of hedge funds.

There are several requirements for a good set of mechanisms to align the interests of investors and managers. These include methods for the investor to ensure the honesty of the fund manager, methods for the investor to be aware of the fund's evolving risks, and contractual agreements and fee structures which discourage the manager from adding hidden risks. Finally, the mechanisms should not discourage the fund manager from fully exploiting any competitive advantage or superior analysis which he might have.

Finance and Cryptography

Previous Work: There are many existing applications of cryptography to financial infrastructure. The most significant practical applications involve well known aspects of securing the transactions themselves: providing authenticity of the parties, integrity and non-repudiation of the transactions, and confidentiality among the parties. Such applications all use cryptography in a generic way, not tailored to any particular requirements of finance.

More interesting advanced finance-related applications of cryptography include fair exchange, secure auctions, and digital anonymous cash. These applications use cryptography as a building block to compose cryptographic protocols which protect some aspect of a transaction, preserve some secret, or prove the correctness of a protocol step. The technique of sending non-interactive proofs relative to previously committed values is pervasive in protocol design.

New Contributions: IThe present invention concerns the release of information about the evolving portfolio's composition and risks. This kind of application has not previously appeared. The present invention concerns an additional mechanism which will help achieve a better balance of information sharing between fund managers and investors. The invention may be used to precisely control the level of transparency in an investment fund. The result is that the investor can ensure that an appropriate level and type of risk is taken, yet the fund can pursue competitive strategies which would not be possible if the restriction of perfect transparency were imposed.

Cryptographic commitments, and zero knowledge proofs provide versatile tools for precisely controlling the delivery of partial and verifiable pieces of information. The present invention concerns these methods in the context of financial risk management.

Long Perceived Need: The finance industry has long sought a mechanism to finely control the release of investment risks, in a way which respects private trading strategies, yet makes fraud difficult. It has long been recognized that portfolio secrecy and verifiability of investment risks and holding are at odds with one another. The famous Long Term Capital hedge fund default may be the most well known example of the dilemma posed by the conflicting advantages of keeping exact portfolio positions secret, and accurately communicating risks to investors. Indeed, before the present invention, it was generally assumed that investors would have to give up verifiability in order to participate in hedge fund strategies. The present invention can be used to provide a solution to a long standing problem; now, risk information can be communicated in a verifiable way to the investor, without eliminating the valuable technique of maintaining private trading strategies.

BRIEF SUMMARY OF THE INVENTION

The present invention provides methods and apparatus to verifiably communicate risk characteristics of an investment portfolio to an investor without disclosing the exact composition of the portfolio. In accordance with one aspect of the invention, a network based system includes at least one server operated by the investment manager, and at least one server or client device operated by an investor, and potentially one or more servers or storage devices operated by one or more third parties. The invention may be used inform the investor of a portfolio's investment risks on a periodic basis while retaining confidentiality of the exact portfolio composition. Cryptographic commitments and zero-knowledge proofs are computed on a server operated by the investment manager, and are verified on the server operated by the investor. The invention may allow an investment manager to commit to the portfolio composition in a legally binding way while retaining confidentiality of the exact portfolio composition. The invention may also allow the investment manager to assert facts about the composition of the committed portfolio, without actually revealing the contents of the portfolio.

In accordance with another aspect of the invention, a set of agreed limitations on the allowed portfolio composition may be specified in the prospectus governing the investment fund, so that the investment manager may assert and prove on a periodic basis that the portfolio's composition respects and is in accordance with the limitations set forth in the prospectus. The invention may also allow the portfolio manager to prove that he is fulfilling his contractual obligation, and the investor has a means of verifying this agreement. The invention may also allow a transparent description of the acceptable investment risks within the prospectus, and provide the investor with a means to ensure that his capital is being managed in accordance with the risk characteristics agreed upon in the prospectus.

In accordance with another aspect of the invention, the set of agreed-upon limitations may be derived from any well-accepted financial risk evaluation procedure, including: financial models which estimate the portfolio's dependence upon specific economic risk factors; financial models which are based upon portfolio valuation under a battery of hypothetical economic scenarios; models which quantify risk in terms of sector allocation; models which measure the extent of leverage including amount and type of short positions, and; models which estimate the variance of the portfolio's value. The invention may also express the limitations and agreements concerning the acceptable types of portfolio risk in terms most commonly used within the finance profession, so that the investor will have the ability to understand the portfolio's risk characteristics in terms of the portfolio's future value under a collection of hypothetical economic scenarios. The invention may also allow for the investment manager not to reveal his investment or trading strategy, and instead retain confidentiality of the exact portfolio composition, while fulfilling the risk communication requirements.

In accordance with another aspect of the invention, the cryptographic commitments to the quantities of the assets held may be sent to a third party, which may retain them for use in special situations, for example, in case fraud is suspected, or a court subpoenas them for any reason. As a potential aspect of the invention, the investment manager may as a matter of protocol de-commit the asset quantities to the third party, or to a fourth party. The invention may also provide the third party, or combination of third and fourth parties with the ability to learn the exact portfolio committed to by the investment manager, and they may then compare them to other financial market transaction data to discourage fraud. The invention may create a very strong legal incentive on the part of the investment manager to execute the terms of the investment contract correctly, including the execution of the risk communication protocol honestly, since any fraudulent cryptographic commitment would serve as clear cut evidence in a court of law.

Other aspects of the present invention will become apparent from the following descriptions, wherein, by way of illustration and example, an embodiment of the present invention is disclosed.

In accordance with a preferred embodiment of the invention, there is disclosed a process for verifiably communicating risk characteristics of an investment portfolio to an investor without disclosing the exact composition of the portfolio comprising:

A procedure for the investment manager to describe acceptable characteristics of an investment portfolio within the portfolio's prospectus, An algorithm and procedure for the investment manager to commit to portfolio contents without disclosing the exact composition, An algorithm and procedure to calculate the risk statistics concerning the limitations specified in the prospectus concerning the acceptable configurations of assets holdings without disclosing the exact composition, An algorithm and procedure to prove that each such statistic is within the numerical range specified in the prospectus, An algorithm and procedure to check the validity of proofs claiming that each statistic is within a particular range, and A set of procedures involving one or more third parties to provide assistance, including sending the commitments for portfolio contents to a court or to a regulatory body in case of dispute.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention provides a system for an investment manager to provide investors with information from which the investor can verify adherence to agreed conditions. According to an embodiment of the present invention, as described herein, an investment manager constructs commitments as to the quantities of assets held and produces zero-knowledge proofs of the portfolio's risk characteristics on a computer or server of the investment manager. The investment manager then sends the commitments electronically to a computer or server operated by the investor. The computer or server of the investor is programmed to operate on the received commitments to verify that all said proofs are consistent with the commitments to the asset quantities. The investment manager server may also send the commitments to a server or computer operated by a third party. The third party can also verify the commitments.

Figure 10:
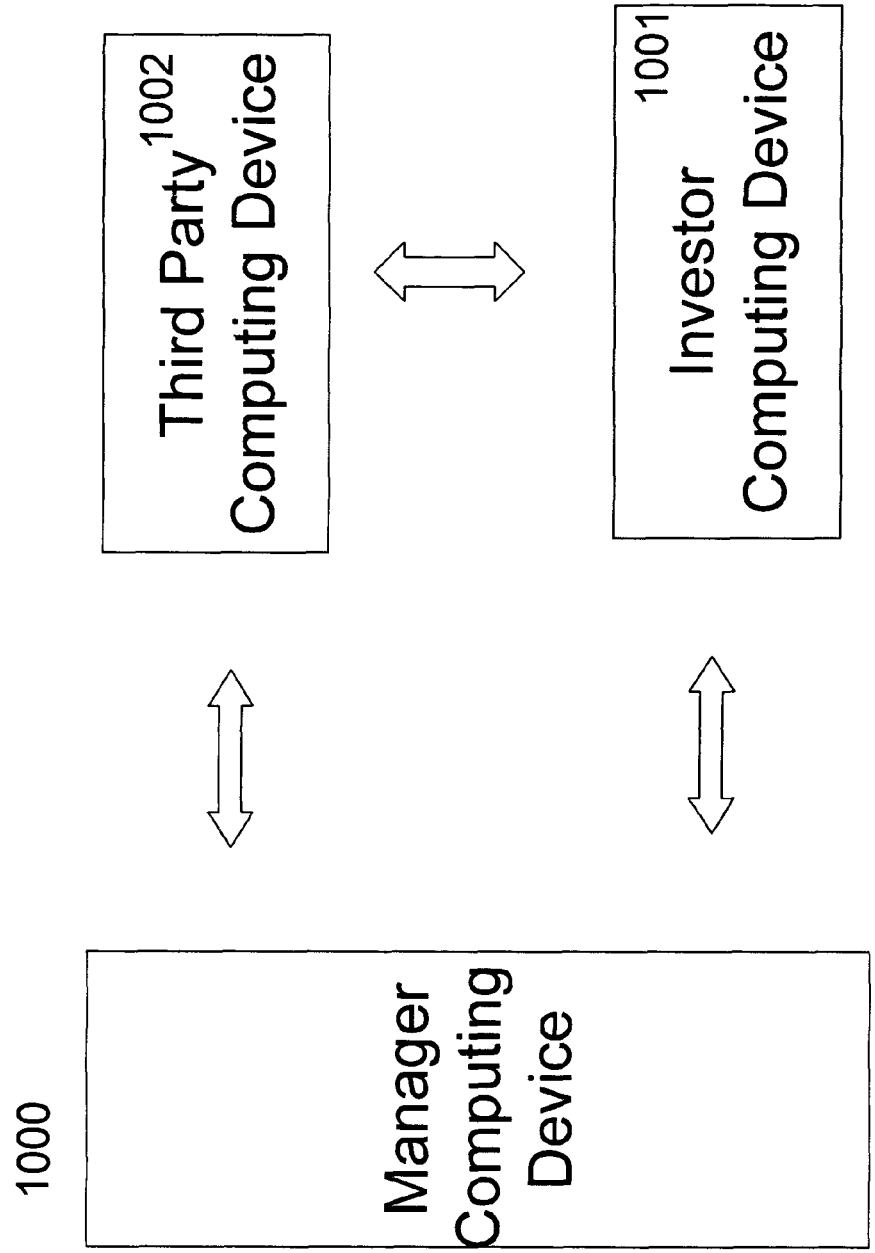
FIG. 10 displays the components of a basic system: three networked computing devices.

FIG. 10 displays the components of a basic system described in the preferred embodiment. Device (1000) is operated by the investment manager to construct commitments as to the quantities of assets held and to produce zero-knowledge proofs of the portfolio's risk characteristics. Device (1001) is operated by the investor to verify that all proofs are consistent with the commitments. Device (1002) is operated by a third party to store the commitments, verify the correctness of the commitments, and possibly to compare the committed values to external transaction records.

Cryptographic Background

A preferred embodiment of the system of the invention employs standard cryptographic techniques related to commitment schemes with a linearity property and zero knowledge proofs. Such proofs include Schnorr proofs and proofs that a committed integer lies in a pre-specified interval. According to the Schnorr proof, p denotes a large prime and q a prime such that q divides evenly into p−1. $G=Z_p$ denotes the group of residue classes of the integers mod-p. g is an element of the group G and h is an element of the group G, such that both g and h are of order q in G and such that the discrete logarithm of h to the base g is unknown. hash denotes a cryptographic hash function with range [0,q−1], implemented, for example, with SHA-1 or SHA-256, two standard secure hash algorithms standardized by NIST, the National Institute for Standards and Technology.

Pedersen Commitment: A cryptographic commitment is a piece of data which binds its creator to a unique value, yet appears random until it is de-committed. The preferred embodiment employs a Pedersen commitments to a group elements x with randomness r. Such a Pedersen commitment is the group element $C_r(x)=g^x h^r$, and can be de-committed by revealing the rand x. This commitment is computatationally binding and unconditionally hiding. Since a commitment can only feasibly de-commit to the original value of x, we also say $C_r(x)$ "corresponds" to x. See T. P. Pedersen, "A threshold cryptosystem without a trusted party (extended abstract)", In Donald~W. Davies, editor, Advances in Cryptology—EuroCrypt'91, pages 522-526, Berlin, 1991. Springer-Verlag. Lecture Notes in Computer Science Volume 547, which is incorporated by reference herein.

Linearity Property: This embodiment makes essential use of the linear (homomorphic) properties which Pedersen commitments enjoy. The first property is that $C_r(x)^a=C_{ar}(ax)$ for any x, r and a. The second property is that $C_r(x) C_{r'}(x')=C_{r+r'}(x+x')$ for any x, x', r and r'. Thus, without knowing the values x and x' that two commitments hide, any party can compute a commitment to any fixed linear combination of x and x'.

Proof of Knowledge: This embodiment also employs zero knowledge proofs of knowledge, which allows a prover to demonstrate knowledge of hidden values without actually revealing them. A proof of knowledge of a (Pedersen) committed integer x demonstrates knowledge of some x and r such that $C_r(x)=g^x h^r$. This embodiment employs non-interactive proofs of knowledge, for which the proof is concentrated in a single piece of data and can be later verified without any further participation of the prover. It is known to those skilled in the art how to prove that a committed value x satisfies some condition $\phi(x)$ without revealing it, and the notation $POK(x,r|C=g^x h^r, \phi(x))$ to denotes a zero knowledge proof of knowledge of (x,r) which satisfies both $C=g^x h^r$ and the predicate $\phi(x)$.

In alternative embodiments, interactive proofs of knowledge may also be employed. An interactive proof involves a challenge sent by a verifier to a prover. The prover computes a response and send it to the verifier who performs an operation to check its validity. An interactive proof will only be successful with high probability if the statement is indeed true and will fail high probability if the statement is false.

Schnorr OR Proofs: This embodiment employs the well-known Schnorr OR proof $POK(x,r|C=g^x h^r, x=0 \text{ or } x=1)$ to prove that x=0 or x=1, (provided this is true), without leaking whether x is 0 or 1. Specifically, the proof data consists of five values $\{C,r_1,r_2,c_1,c_2\}$ such that $c_1+c_2=\text{hash}(a_1,a_2) \pmod{q}$, where $a_1=h^{r_1} C^{-c_1}$, and $a_2=h^{r_2} (C/g)^{-c_2}$. Any verifier can efficiently check these conditions. This kind of zero knowledge proof satisfies the cryptographic properties of completeness, zero knowledge and soundness. See Claus P. Schnorr, "Efficient identification and signatures for smart cards", In Advances in Cryptology—Crypto'89, pages 239-252, New York, Inc., 1989, Springer-Verlag, which is incorporated by reference herein.

Interval Proofs: This embodiment employs proofs that a committed integer satisfies an inequality such as x is greater than or equal to A by proving that x lies in an interval [A,B] for a large enough integer B. This embodiment uses the classic interval proof based on bounding the bit length of an integer.

See R. Cramer, I. Damgaard, and B. Schoenmakers, "Proofs of partial knowledge and simplified design of witness hiding protocols", In Y. G. Desmedt, editor, Advances in Cryptology—Crypto'94, pages 174-187, Springer-Verlag, 1994, Lecture Notes in Computer Science Volume 839, and E. F. Brickell, D. Chaum, I. B. Damgaard, and J. van de Graaf, "Gradual and verifiable release of a secret", In Carl Pomerance, editor, Advances in Cryptology—Crypto'87, pages 156-166, Berlin, 1987. Springer-Verlag, Lecture Notes in Computer Science Volume 293, both of which are incorporated by reference herein.

According to this type of proof that x lies in the interval $[0, 2^k-1]$, which is denoted $POK(x,r|C=g^x h^r, x \in [0, 2^k-1])$, first x is expanded in binary: $x=\Sigma_0^k(2^i a_i)$. Next, for each digit $a_i$, a commitment $C_i = C_{r_i}(a_i)$ is produced. The commitment to the last digit is set to be $C/\Pi_1^k(C_i^{(2^i)})$, so that the relation $C=\Pi_0^k(C_i^{(2^i)})$ holds. An alternative to adjusting the last digit's commitment value is to append an auxiliary proof that C and $C=\Pi_0^k(C_i^{(2^i)})$ are commitments to the same number. Finally, for each digit $a_i$ a Schnorr OR proof is computed which demonstrates that each $a_i$ is equal to 0 or 1. The validity of such interval proofs can be verified by checking that the list of k Schnorr proofs are valid, and checking that the relation $C=\Pi_0^k(C_i^{(2^i)})$ holds.

This embodiment may also construct a proof that an integer x is in the range $[A, 2^{k-1}+A-1]$, by following the same procedure, but replacing C with $C/g^A$. These proofs are reasonably efficient in practice, as long as the interval is not too large. This description is not intended to limit the scope of the invention to any particular type of proof that a committed integer lies in an interval, and alternative constructions for interval proofs do exist, for example, see F. Boudot., "Efficient proofs that a committed number lies in an interval", In Bart Preneel, editor, Advances in Cryptology—EuroCrypt'00, pages 431-444, Berlin, 2000. Springer-Verlag, Lecture Notes in Computer Science Volume 1807, which is incorporated by reference herein for alternate constructions designed for time and space efficiency.

Further Notation: This embodiment will need to make commitments to a large set of quantities representing asset quantities and prove statements about linear combinations of them. In this embodiment $A_i$ denotes a universe of asset types $A_i$, and $b_i$ denotes an amount of asset type $A_i$, and $C_i$ denotes a commitment to quantity $b_i$. By virtue of the homomorphic property of Pedersen commitments, for any list of coefficients $m_i$, the product $\Pi C_i^{m_i}$ is a commitment to $\Sigma m_i b_i$, and can thus be publicly computed from the $C_i$ and $m_i$.

This embodiment uses the interval proof technique reviewed above, to allow the creator of the commitments to prove that $\Sigma m_i b_i$ is an integer in the range $[Q, Q+2^k-1]$ for any threshold integer Q. Since all of the zero-knowledge proofs used in this embodiment are with respect to the same $C_i$ hiding $b_i$, the expression $POK(x,r|C=g^x h^r, x \Sigma [Q, 2^k+Q-1])$ is henceforth abbreviated to the more succinct expression which also de-emphasizes the interval length $ZKP_k(\Sigma m_i b_i, \leq Q)$. Similarly, a zero knowledge proof that an expression is bounded above is denoted $ZKP_k(\Sigma m_i b_i, \geq Q)$.

To summarize, this proof data created in this embodiment allows any verifier with the quantities $C_i$, $m_i$, and Q to check that $\Sigma m_i b_i \leq Q$ for the integers $b_i$ hidden in $C_i$ Details of the System The Basic Approach: The system and process of the present invention provides an investor with a tool to verify claims made by a fund manager. There are both contractual and cryptographic elements incorporated into the system and process of the present invention. Additionally, the involvement of a third party can enhance the effectiveness of the scheme, as discussed below.

As part of the financial design phase, a universe of possible asset types is chosen, and the kinds of risk information to be verifiably communicated are identified. Such parameters are incorporated into the contract governing the fund. The present embodiment includes these components, which are not universally included in all fund prospecti Contractual Aspects: Every fund is required to have a prospectus which specifies the rights and obligations of the investor and the fund. The prospectus includes the mechanics of the contributions, payments, withdrawals, and fees. The prospectus may also specify or limit the types of investments to be made within the fund. The specific limits are chosen by the architect of the fund based upon the risk profile and management strategy that he will follow. As part of a required legal agreement, the fund is obligated to respect these conditions. However, such guarantees become more meaningful when there is a mechanism for the investor to verify them in real time. The present invention provides a process to facilitate this type of verification.

Within the prospectus a list of allowable assets is specified. The assets can be directly identified by symbol if the security is market traded, and if not, described via their characteristics. Illiquid or private assets such as real estate, commercial mortgages, private bonds, or reinsurance contracts, can still be identified by descriptive categories. The units must be specified for each security, or asset type, since the rest of the protocol requires that the quantities be represented as integers. In the present embodiment, the risk conditions are expressed in the contract, and are expressed in a specific form to be compatible with the framework of the invention. According to a preferred embodiment, the conditions on the quantities of assets may take the form $\Sigma m_i b_i \geq Q$ or the form $\Sigma m_i b_i \leq Q$ where the set of coefficients $m_i$ and bound Q determine the nature of the condition. The list of conditions incorporated into the contract are denoted by $Limit_j$. It is easy to see how such conditions might be used to limit the amount invested in a single security, asset type, or sector. Such conditions can also be used to bound total exposure to a specific risk factor, or expected value under a hypothetical scenario, as discussed below. Thus, the linear form of the conditions is not too restrictive. According to a preferred embodiment, applications using factor exposures or scenario analysis also place additional data in the contract. This additional data which may be placed in the prospectus includes the list of asset types $A_i$, the list of conditions $Limit_j$, and optionally also includes the list of risk factors $F_j$, the list of risk factor exposures $e_{i,j}$, the list of scenarios $S_j$, and the list of scenario valuations $v_{i,j}$.

The Protocol Steps: Once the prospectus has been fully designed, the fund manager may solicit funds from investors and invest the capital in a manner consistent with the contractual restrictions. As often as specified in the contract, (e.g. daily), the fund manager will commit to the portfolio, and produce statements and proofs for each of the contractual risk-limitations. The commitments may also be sent to a third party to facilitate resolution of disputes. According to a preferred embodiment, the protocol takes the following form: First, the fund manager commits to the asset quantities $b_i$ with commitments $C_i$ Next, the fund manager delivers the commitments $C_i$ to the investor, and optionally to a third party. Next, and optionally, the fund manager also sends a de-commitment of the committed asset quantities $b_i$ to the third party. This may require the transmission of decryption or de-commitment keys $k_i$ used in the construction of commitment $C_i$. Next, the fund manager asserts that conditions $Limit_j$ are fulfilled, computes proofs the form $\Sigma\, m_i\, b_j \geqq Q$ or the form $\Sigma\, m_i\, b_i \leqq Q$ and sends them to the investor. Next the investor verifies the completeness of the correctness of the proofs. Finally, in case of a dispute, the commitments may be opened or revealed by the third party. If the actual portfolio holdings do not match the committed holdings, the commitments serve as direct evidence of fraud. We now elaborate on several aspects of this protocol.

Trading Behavior: According to a preferred embodiment, in order to respect the contractual risk conditions, the fund manager may check that the risk profile would remain sound before effecting any transaction.

Commitment Step: According to a preferred embodiment, using the commitment scheme reviewed above, the number of units of asset quantities $b_i$ of each asset $A_i$ is committed to. The package of committed asset values is digitally signed and timestamped, and sent to the investor. The commitments are binding—once made they can not be de-committed to a different value. This serves as strong incentive against deliberate misstating of the portfolio. Of course, it is impossible to rule out the possibility that the fund manager lies about the asset quantities $b_i$ in order to misrepresent the status of the fund. However, the quantity held of a particular asset at a given point in time is an objective piece of information. Making such a false statement would clearly be fraud.

Figure 1:
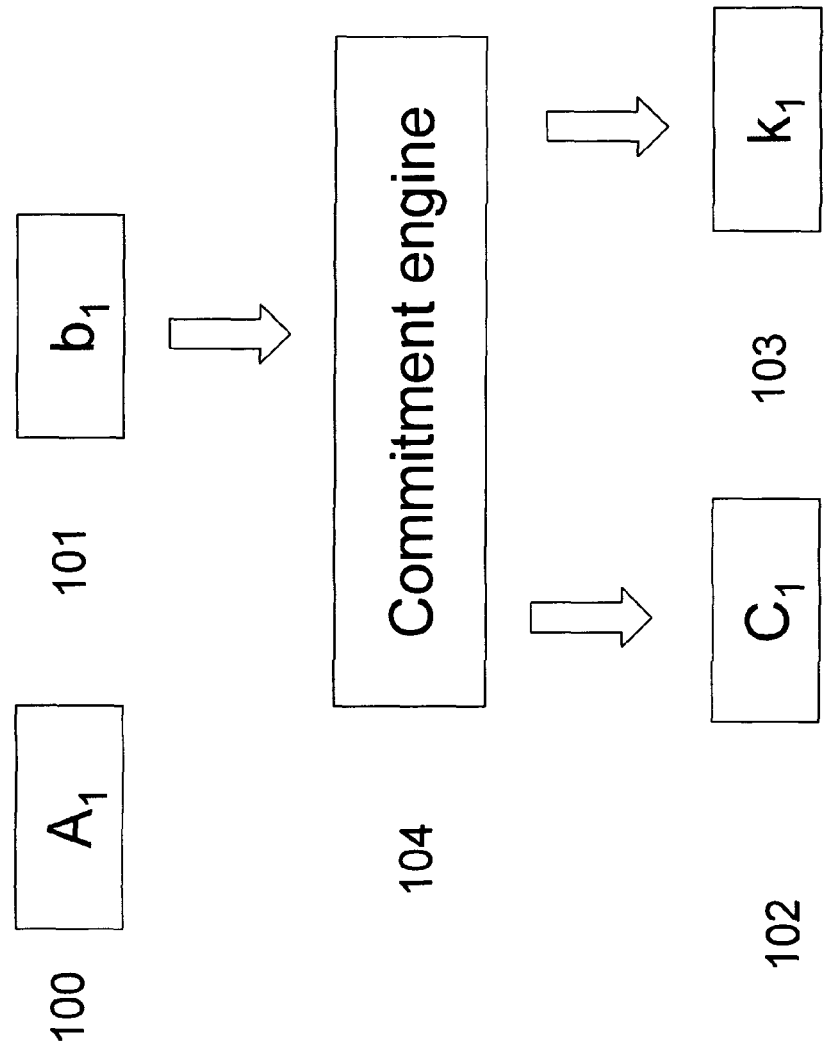
FIG. 1 is a high level block diagram showing a procedure for committing to the asset quantities.

FIG. 1 illustrates the commitment procedure in the preferred embodiment. The asset quantities $b_i$ (101) of each asset $A_i$ (100) are processed with a commitment engine (104) to compute a commitment $C_i$ (102) which hides the quantity $b_i$ yet is bound to the quantity $b_i$. With a secret decommitment key $k_i$ (101) the value committed to with $C_i$ can be decrypted (also called de-committed).

Third Parties: The preferred embodiment employs a third party to increase the effectiveness of the fund's incentive to commit honestly to the portfolio. For example, the committed portfolio might also be sent directly to the SEC, or to a different regulatory organization.

When the corresponding de-commitments are included in the message to the SEC, or other third party, this organization can also act as a trusted third party, confirming the correctness of the commitments, against independent information procured about the fund's contents, for example, by examining exchange records, and brokerage transactions. In this embodiment, the investor will have an even stronger guarantee, despite still never learning the actual asset quantities.

An alternative to the SEC would be another independent organization, such as a data storage firm, which would timestamp the commitment data, keep the de-commitments (if included) private, and readily provide the data to a court in case it is subpoenaed. If the protocol is implemented without sending the de-commitments to the third party, the commitments still serve as evidence should a court order them to be opened. Another alternative embodiment may employ multiple third parties, and use a technique of secret splitting so that two or more entities need to cooperate to obtain the data. See A. Shamir., "How to share a secret", Communications of the Association for Computing Machinery, 22(11): pages 612-613, November 1979, which is incorporated by reference herein.

Computing the Proofs: According to a preferred embodiment, the proofs of the form $ZKP_k(\Sigma\, m_i\, b_i \leqq Q)$ or of the form $ZKP_k(\Sigma\, m_i\, b_i \geqq Q)$ are computed according to the process reviewed above. However, it is not the intention to restrict the proofs to take this form for this invention. One technical detail to consider is the choice of the interval length parameter k. The interval should be large enough so that a proof may always be found if the inequality of the form $\Sigma\, m_i\, b_i \leqq Q$, or of the form $\Sigma\, m_i\, b_i \geqq Q$ holds. The preferred embodiment calculates an upper bound for the required k by considering the minimum and maximum possible values of $\Sigma\, m_i\, b_i$.

Figure 2:
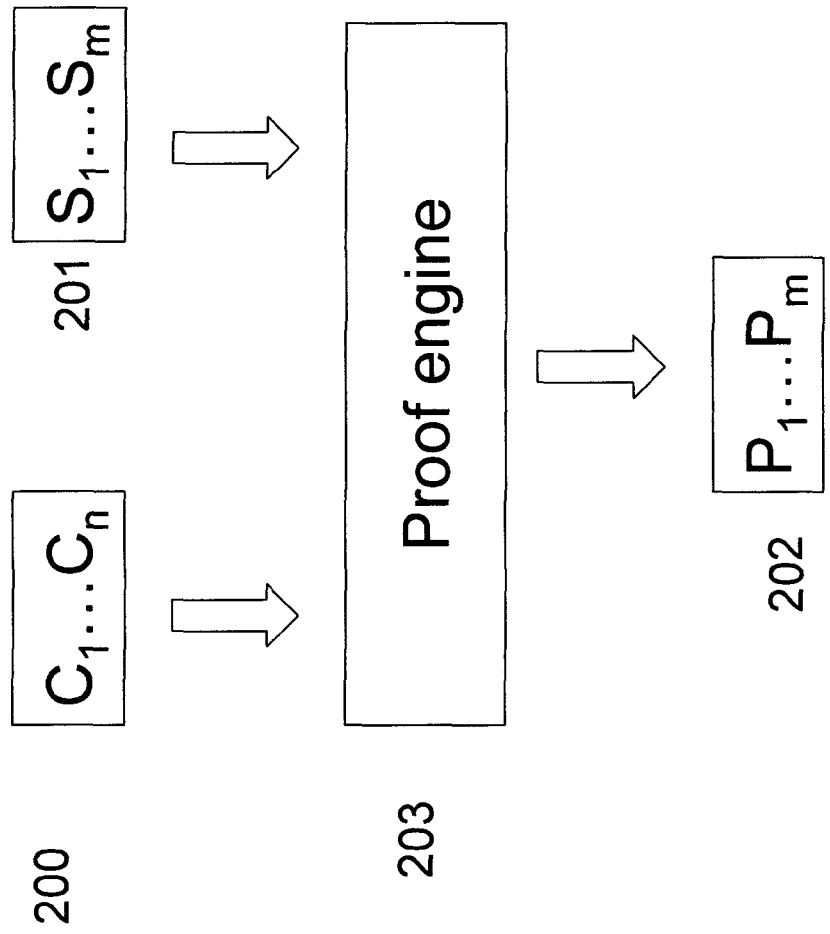
FIG. 2 is a high level block diagram showing a procedure to prove risk assertions about the committed asset quantities.

FIG. 2 illustrates the relationship between the committed asset quantities, the risk assertions and the proofs of these assertions. The object of each proof concerns the asset quantities $b_i$ hidden in the commitments $C_i$ (200). The risk assertions to be proved are denoted $S_i$ (201), and cryptographic techniques described above are used in a proof engine (203) to construct proofs $P_i$ (202) of the risk assertions $S_i$.

Figure 3:
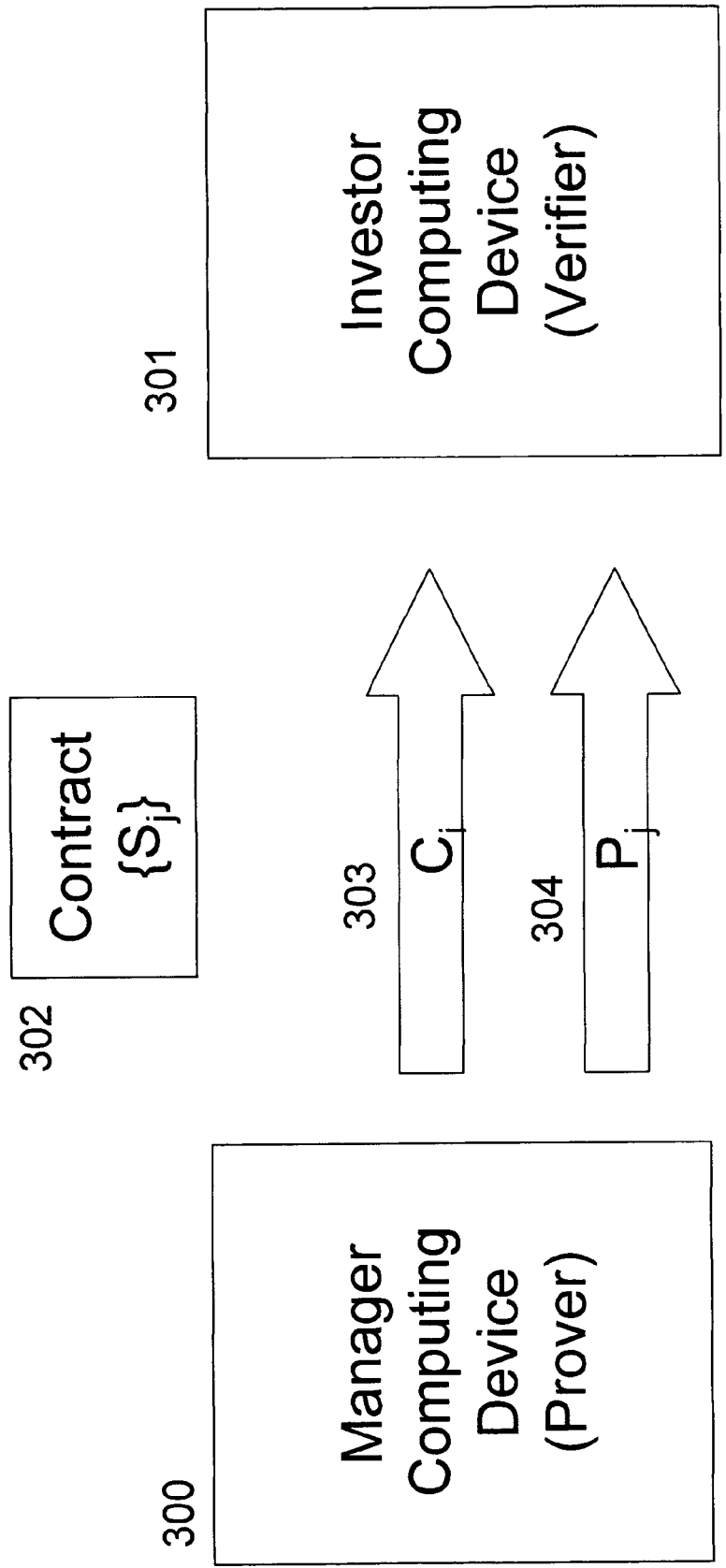
FIG. 3 shows the communication of commitments and risk assertions from one device to another and also shows the contract governing the assertions to be proved.

FIG. 3 illustrates the communication of the commitments and risk statements. Device (300) is possessed by the portfolio management and it contains the data comprising the actual asset quantities. The assertions $S_i$ to be proved are specified with the help of the investment contract (302). The commitments to the asset quantities $C_i$ (303) and the proofs $P_i$ (304) may be generated on device (300) and are sent to device (301) which is possessed by the investor. Device (300) may be a server networked to device (301) which may be a client computer.

Verification Step: According to a preferred embodiment, the investor may perform a step to verify the correctness of the proofs. This verification process follows the process reviewed above which allows the investor to check the validity of each zero-knowledge proof. During this verification step, the investor may consult the prospectus to obtain the authenticity and completeness of the parameters $m_i$ and Q which specify the condition $Limit_j$. One the proof data is verified to be complete and correct, the investor will know that the claimed statements constraining the assets are correct, relative to the assumption that the commitments themselves were not fraudulently created.

Failures and Disputes: If any verification step fails, then the investor knows that a condition of the investment contract has been breached. This will never happen if the fund manager respects the fund composition restrictions. In the preferred embodiment, if there is a legitimate reason for the manager to violate a constraint specified in the contract, the manager will not publish a proof-attempt that will fail, but rather address the problem directly by communicating this reason to the investor.

In case of a legal dispute, the commitments can serve as evidence of the claimed portfolio, and as mentioned above, third parties can assist in such a process.

Figure 4:
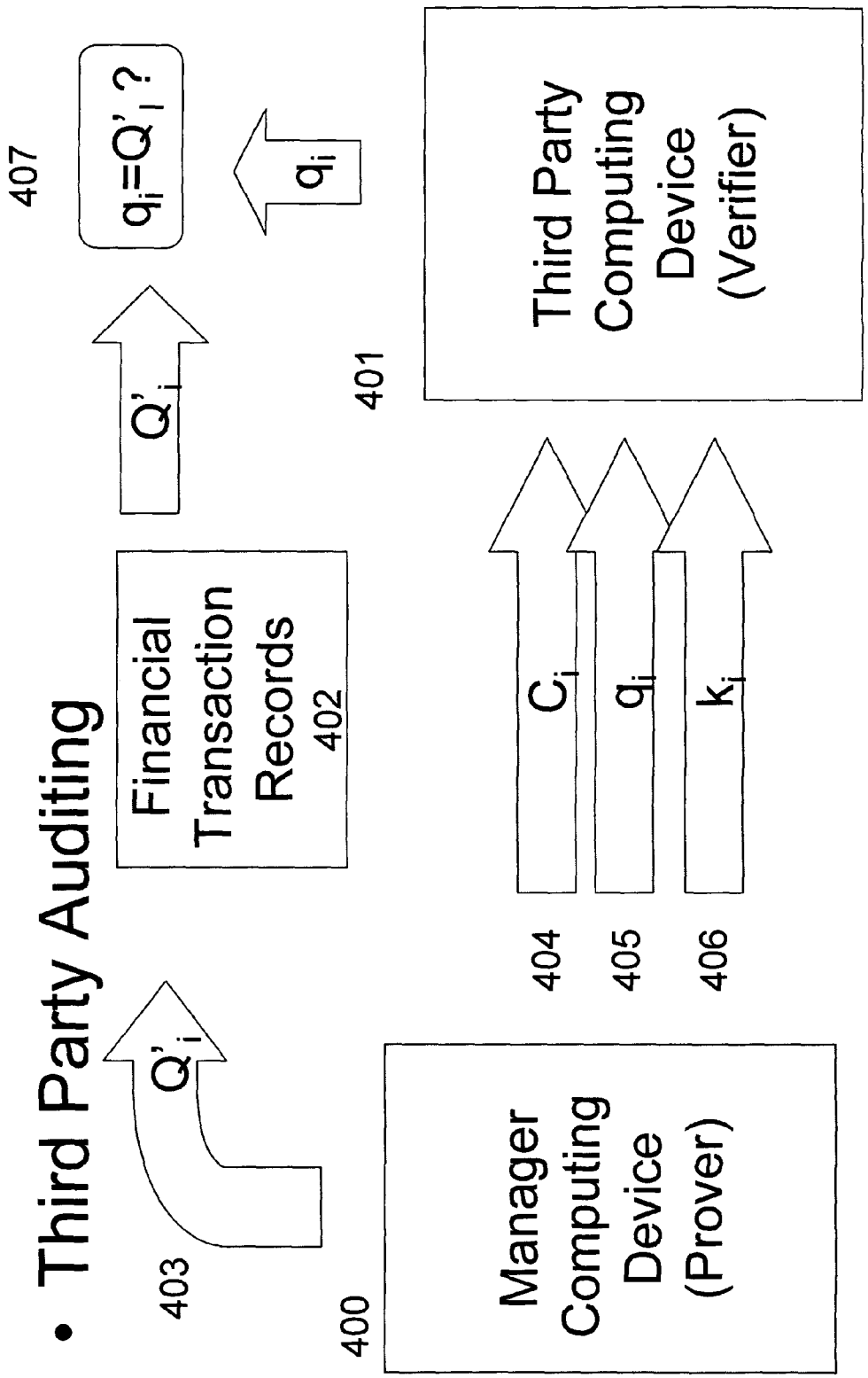
FIG. 4 illustrates a procedure to audit the correctness of a committed asset quantity by having a third party open the commitments and compare them to external transaction data.

FIG. 4 illustrates how a third party can verify the correctness of the committed asset values. Device (400) is possessed by the portfolio management and it contains the data comprising the actual asset quantities. The actual holdings $Q'_i$ are ultimately determined in terms of real world financial transactions which are there may be external records (402) and evident thereof. In order to allow a third party to assist in certifying the correctness of the commitments, device (400) sends the commitments $C_i$ (404), the asset quantities $q_i$ (405) and the keys $k_i$ (406) required to open commitments to device (401) possessed by the third party. The third party can verify that the quantity commitments $C_i$ contain the claimed quantity $q_i$, and can subsequently compare these values with the actual quantities $Q'_i$ recorded in market transactions.

Discussion: It is clear that the fund manager and investor will need appropriate infrastructure to fully benefit from this mechanism, so it may be most applicable to large institutional investors. A hedge fund which is able to offer this kind of additional assurance would be compensated with the ability to attract greater business, and/or the service might be reflected in the fee that the fund is able to charge.

The scheme increases the accountability of the fund manager, as the investor will have continuous confirmation that the fund has not left the acceptable risk range. The mechanism we describe is certainly stronger than the reputation and post-facto legal based approaches in place today. Through the deliberate specification of acceptable risk bounds in the fund prospectus, the mechanism provides strong incentive for the fund manager to manage the portfolio in a manner which is more closely aligned with investors' risk preferences. Conversely, it discourages investment behavior that concentrates enormous risk on an unlikely scenario, unless the investor agrees to this kind of gamble.

Construction of Specific Risk Statements

Having outline the basic protocol in the preferred embodiment, we now turn to the portion of the embodiment which describes how to design meaningful risk constraints, and use them within the system. As previously noted, in the preferred embodiment, the constraints are bounds on integral linear combinations of the asset quantities $b_i$. We begin by discussing basic constraints on the portfolio composition, then discuss constraints based on factor exposures and scenario analysis.

Individual Asset Bounds: The preferred embodiment may employ simple constraints of the form $b_i \leq Q_i$, which serve to limit the amount of capital invested in a particular single asset $b_i$. By using this simple constraint for every potential asset specified in the prospectus, the investor obtains assurance that the fund is not placing an overly significant bet on the performance of a single security.

Asset Class and Sector Allocation: The preferred embodiment may organize the list of assets into sectors or asset types, a bound on the total investment in a particular sector can be expressed as $\Sigma\, m_i\, b_i \leq Q$ where $m_i$ coefficients are non-zero for the assets within the sector, and represent a weighting according to the asset unit's price at the fund's inception. Sector allocation statements and proofs relative to updated, current asset prices can also be made, but these bounds can not be contractually guaranteed in the same way, it is not the intention to exclude this type of statement from the scope of the invention.

Asset Features, Short Positions: The preferred embodiment may, following the same technique as for sector allocation, grouped the assets in any way desired, and an inequality can be constructed which bounds the value invested in such a subgroup. An important example of this is to group the short positions, and bound the amount of asset shorting. This can be accomplished by listing the short positions as distinct assets, or by using constraints of the form $\Sigma\, m_i\, b_i \geq -Q$, where the quantities $b_i$ are negative integers representing the number of asset units shorted. Bounding the acceptive complementary short and long positions limits the risks associated with extreme leveraging techniques and helps to communicate liquidity risk to the investor.

Current Minimum Value: The preferred embodiment may also provide an estimation of current value and communicate it by setting coefficients $m_i$ to be the current price of a unit of asset $A_i$, and proving a statement of the form $\Sigma\, m_i\, b_i \geq Q$ for any value of $Q$ less than the actual sum $\Sigma\, m_i\, b_i$. Since such a statement depends on current prices and assets may lose value, the investment manager can not rigorously guaranteed this type of bound in the prospectus, but it may still be a useful piece of information to relate to the investor.

Factor exposures: The preferred embodiment may also prove assertions which rely on risk models which assign each asset $A_i$ a factor exposure $e_{i,j}$ to a particular risk factor $F_j$. According to such models, the exposure is an estimation of the sensitivity, d(value)/d(factor), to the factor. To use this kind of constraint, the exposures $e_{i,j}$ for factor $F_j$ should be published in the contract. The aggregate sensitivity of the portfolio to $F_j$ is then $\Sigma\, e_{i,j}\, b_i$, which may be positive or negative. This quantity may be bounded above and below with constants, $Q_j$ and $Q'_j$ with the inequalities $-Q'_j \leq \Sigma\, e_{i,j}\, b_i$, and $\Sigma\, e_{i,j}\, b_i \leq Q_j$. This provides a guarantee to the investor that the portfolio is not too sensitive to the factor $F_j$. For example, such constraints might be used to limit the interest rate risk that the portfolio is allowed to take, or the amount of credit risk. The preferred embodiment may include the factors $F_j$ and the exposures $e_{i,j}$ into the fund prospectus, or alternatively simply include the assertion itself in the prospectus, or both.

Figure 6:
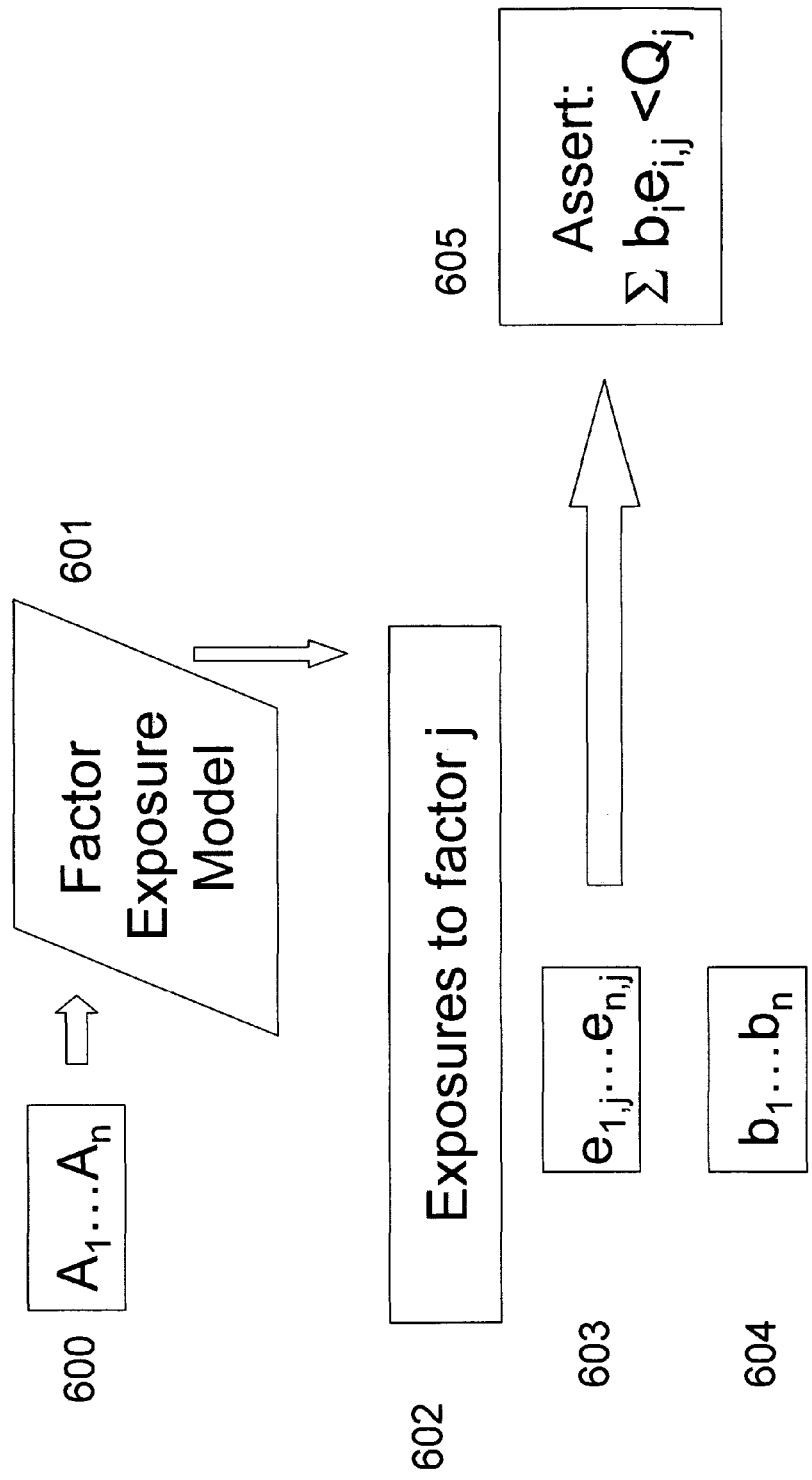
FIG. 6 illustrates a procedure to construct an assertion about a linear combination of the asset quantities so as to bound the exposure to a particular financial risk factor in terms of a model which measures the exposure of individual assets to said factor.

FIG. 6 illustrates the use of factor analysis in the construction of risk assertions. For a fixed risk factor $F_j$, each asset $A_i$ (600) is modeled according to an asset risk model (601) producing measurements of the assets exposure (602) The exposure of asset $A_i$ to this risk factor is marked as $e_{i,j}$ (603). The assertion (605) is defined in terms of these exposures; the secret asset quantities $b_i$; (604) and a bound on the aggregate exposure $\Sigma\, e_{i,j}\, b_i$, This proof indicates that the portfolio has been managed in a way which bounds the total exposure to the risk factor $F_j$.

Scenario analysis: The preferred embodiment may also prove assertions which are derived from scenario analysis. The bounds in these assertions extends the benefit obtained by considering a single risk factor in isolation. First, a set of economic scenarios are selected, denoted $S_j$, which define a set of potential future trajectories of various economic factors. Next, some model must be used to estimate the value $v_{i,j}$ of each asset $A_i$ under each scenario $S_j$. The prospectus lists the battery of scenarios, and also lists the expected value of each asset under each scenario, and makes reference to the modeling technique used. Finally, an "acceptable risk" threshold is specified in the prospectus by listing the portfolio's minimum future value, denoted $SV_j$, under each scenario $S_j$ described in the contract. The expected future value of the portfolio under scenario $S_j$ is simply $P_j = \Sigma\, v_{i,j}\, b_i$, so the bound we are interested in takes the form $\Sigma\, v_{i,j}\, b_i \geq SV_j$. The preferred embodiment may include the scenarios $S_i$ and the scenario valuations $v_{i,j}$ into the fund prospectus, or alternatively directly include the assertion itself in the prospectus, or both.

Figure 5:
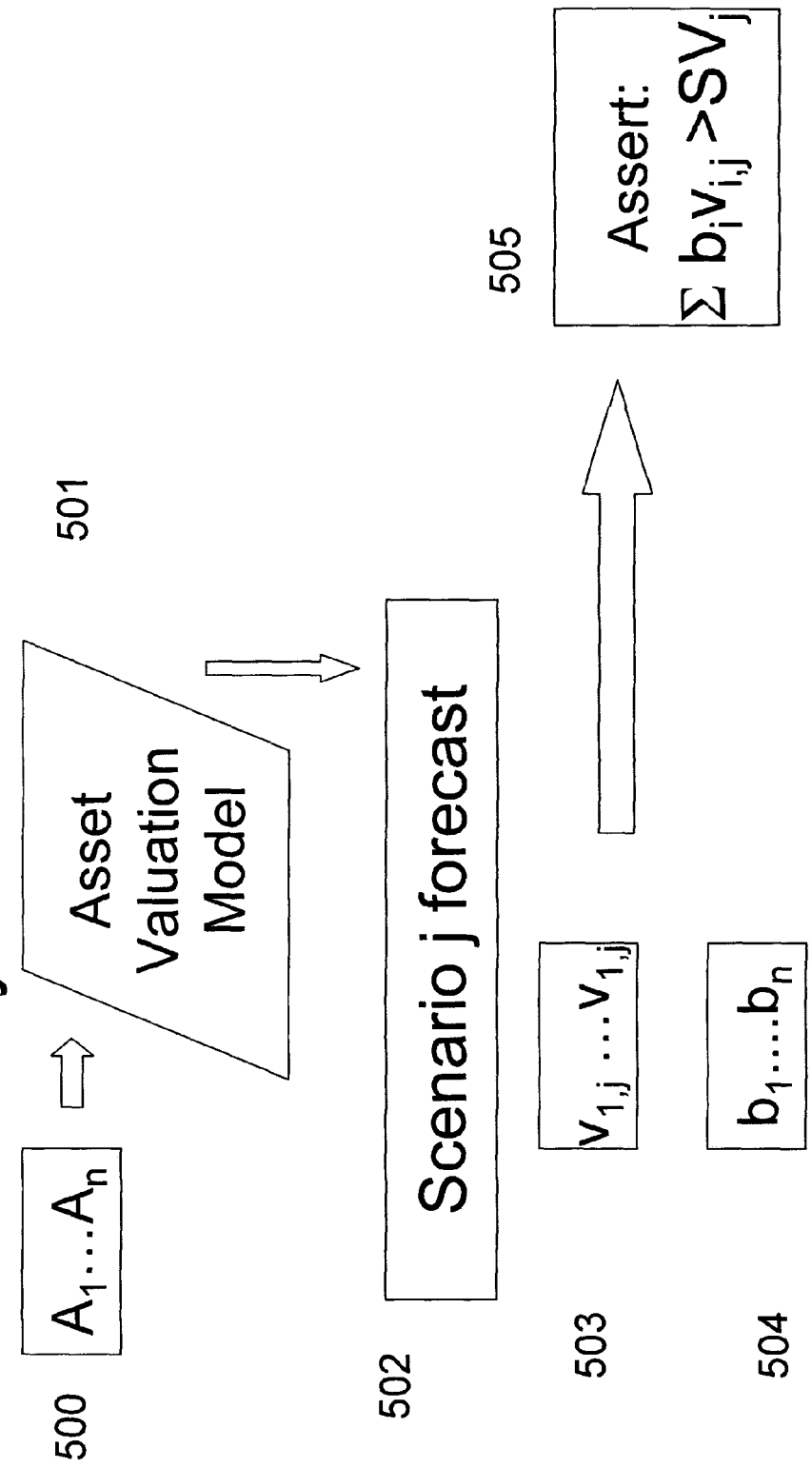
FIG. 5 illustrates a procedure to construct an assertion about a linear combination of the asset quantities so as to bound the portfolio's value under a hypothetical future scenario.

FIG. 5 illustrates the use of scenario analysis in the construction of risk assertions. For a fixed scenario $S_j$, each asset $A_i$ (500) is modeled according to an asset valuation model (501) producing an hypothetical economic forecast (502) for that scenario. The value of asset $A_i$ under this scenario is marked as $v_{i,j}$ (503), The assertion (505) is defined in terms of these valuations; the secret asset quantities $b_i$; (504) and a bound on the sum $\Sigma\, v_{i,j}\, b_i$, This proof indicates that the portfolio has been managed to maintain at least a specified value under this scenario.

The validity of this approach does not depend on the choice of model: the values $v_{i,j}$ must be published, and the investor must find them reasonable to accept the contract. However, in order to be useful, the preferred embodiment will choose a model which is commonly used by those skilled in the art of risk modeling. Of course, the manager can't guarantee future portfolio values, but he can guarantee that he will never take a position which will assume less than the contractual minimum value under any of the listed hypothetical scenario, however unlikely he feels that the scenario is.

Such scenarios are idealized, discreet, future possibilities, and the actual outcome is unlikely to closely follow an actual scenario listed. Nevertheless, such bounds are very useful since they force the fund to maintain a composition for which it is not expected to lose too much value under an adversarial scenario.

Trading volume: The preferred embodiment may also prove assertions which concern yet another type of bound: A useful assertion to communicate risk characteristics to an investor concerns a limitation on the total trading activity which is contractually allowed. The implementation of this kind of bound differs slightly from the previous framework, in which all the assertions depend on the committed portfolio at one instant. To incorporate the ability to provide this kind of bound, the scheme must also provide separate commitments to the amounts of each asset purchased and sold, each as a positive number. Then bounds on the total amount of sales and purchases over some period can also be expressed as linear conditions, and the same types of zero knowledge proofs employed. This application may be useful to detect a certain type of fraud masquerading as "market timing", where redundant trades are made not to improve the portfolio's position, but to earn brokerage fees associated with each trade.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims (to be included in the utility filing).

Alternate Embodiments: The invention is intended to cover all manifestations of electronic communications which relay risk information, and partial portfolio content information by means of cryptographic commitments or zero knowledge proofs or both. The role of the trusted third party or verifying parties may differ from the example described above. The essence of the invention is the use of cryptographic tools such a a commitment of the portfolios content; and statements which refer to these asset quantities to communicate portfolio risk information, and; potentially enhanced with the use of cryptographic or interactive proofs to facilitate verification of one or more characteristics of a portfolio, and this invention is intended to cover all such uses.

An example of an alternative embodiment concerns the employment of an interactive proof technique instead of a non interactive proof technique.

Figure 8:
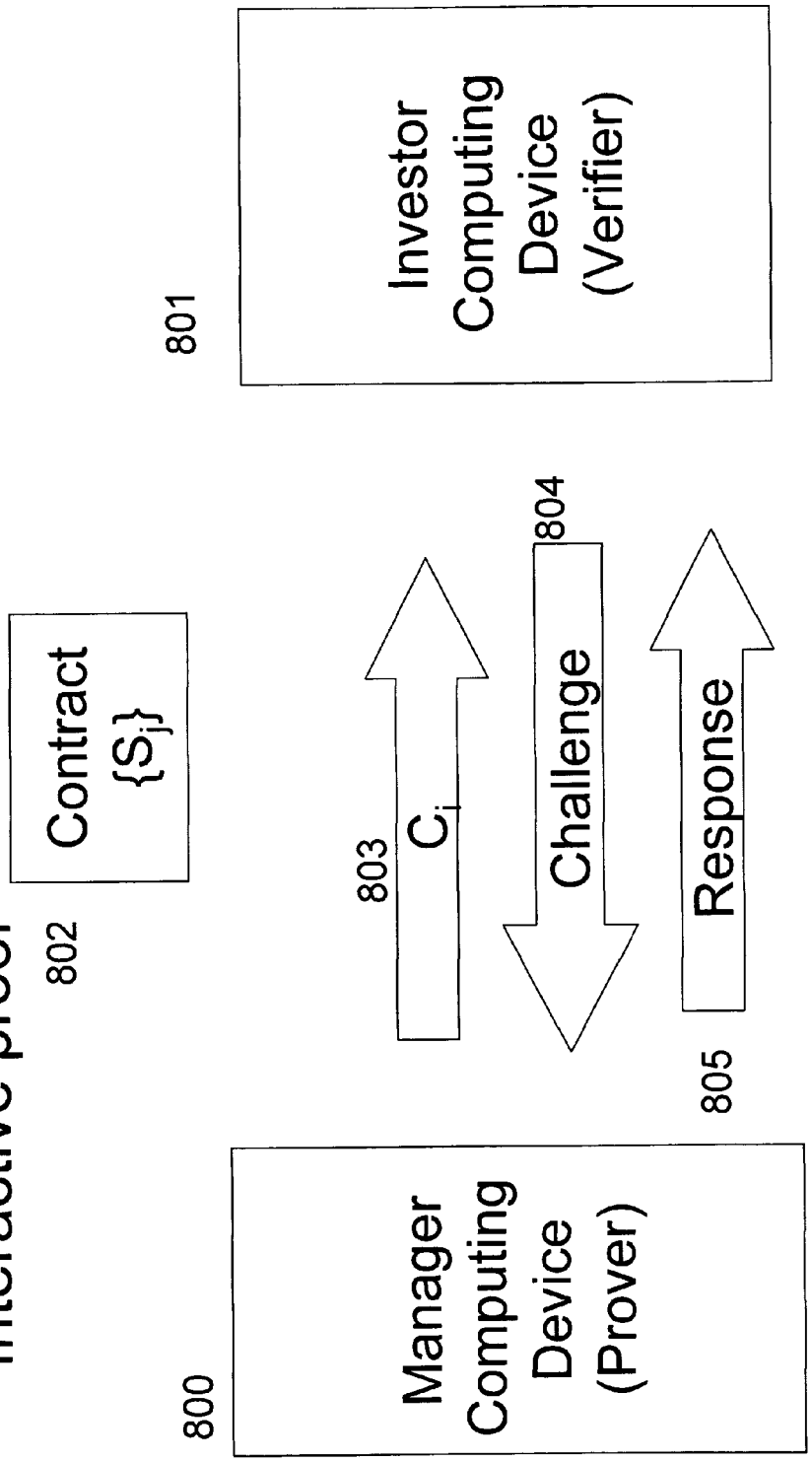
FIG. 8 shows how proofs of the risk assertions can be implemented with an interactive proof technique involving communication between two devices.

FIG. 8 shows how proofs of the risk assertions can be communicated with the assistance of an interactive proof technique involving communication between two devices. Following the framework of the preferred embodiment, device (800) is possessed by the portfolio management and it contains the data comprising the actual asset quantities. The assertions $S_i$ to be proved are specified with the help of the investment contract (802). The commitments to the asset quantities $C_i$ (803) may be generated on device (800) and are sent to device (801) which is possessed by the investor. The proofs of assertion $S_i$ is generated in a manner which differs from that of the preferred embodiment in that the a cryptographic interactive proof is used as follows: the investor's computing device (801) sends a challenge (804) to the manager's computing device (800) which responds by calculating and sending a response (805) back to device (801). Device (801) will attempt to verify the response to the challenge and if successful will be convinced of the truth of assertion $S_i$. Device (800) may be a server networked to device (801) which may be a client computer.

Another example of an alternative embodiment is a simplification of the preferred embodiment described above. In this embodiment the investment manager commits to portfolio contents without disclosing the exact composition by means of constructing cryptographic commitments of the asset quantities or encryptions of the asset quantities and delivers these committed value to the investor or a third party or any combination of the investor and third parties. This may be useful since it can be used to establish an additional means of recording the portfolio contents at a point in time and may be later decrypted to assist in auditing, for example. The investment manager may also deliver decryption keys or decommitment keys to one or more third parties to assist in any required decryption of the committed values. This may be useful since it assists in establishing a means of retroactively determining the contents of the committed values which may serve as evidence. The investment manager may also employ algorithms and procedures to calculate risk statistics in terms of the asset quantities and generate assertions bounding these risk statistics and deliver these assertions to the investor or a third party or any combination of the investor and third parties. This is useful since it directly asserts risk information concerning the portfolio, and additionally references the committed asset quantities. The investment manager may also deliver a description of the algorithms and procedures used in the generation of the risk assertions to the investor or a third party or any combination of the investor and third parties. This is useful since it allows verification of the assertions to be made at a subsequent time in which the asset quantities may be decrypted. This alternative embodiment provides a means of establishing a robust verifiable means of risk communication which does not depend on zero knowledge proofs.

Figure 9:
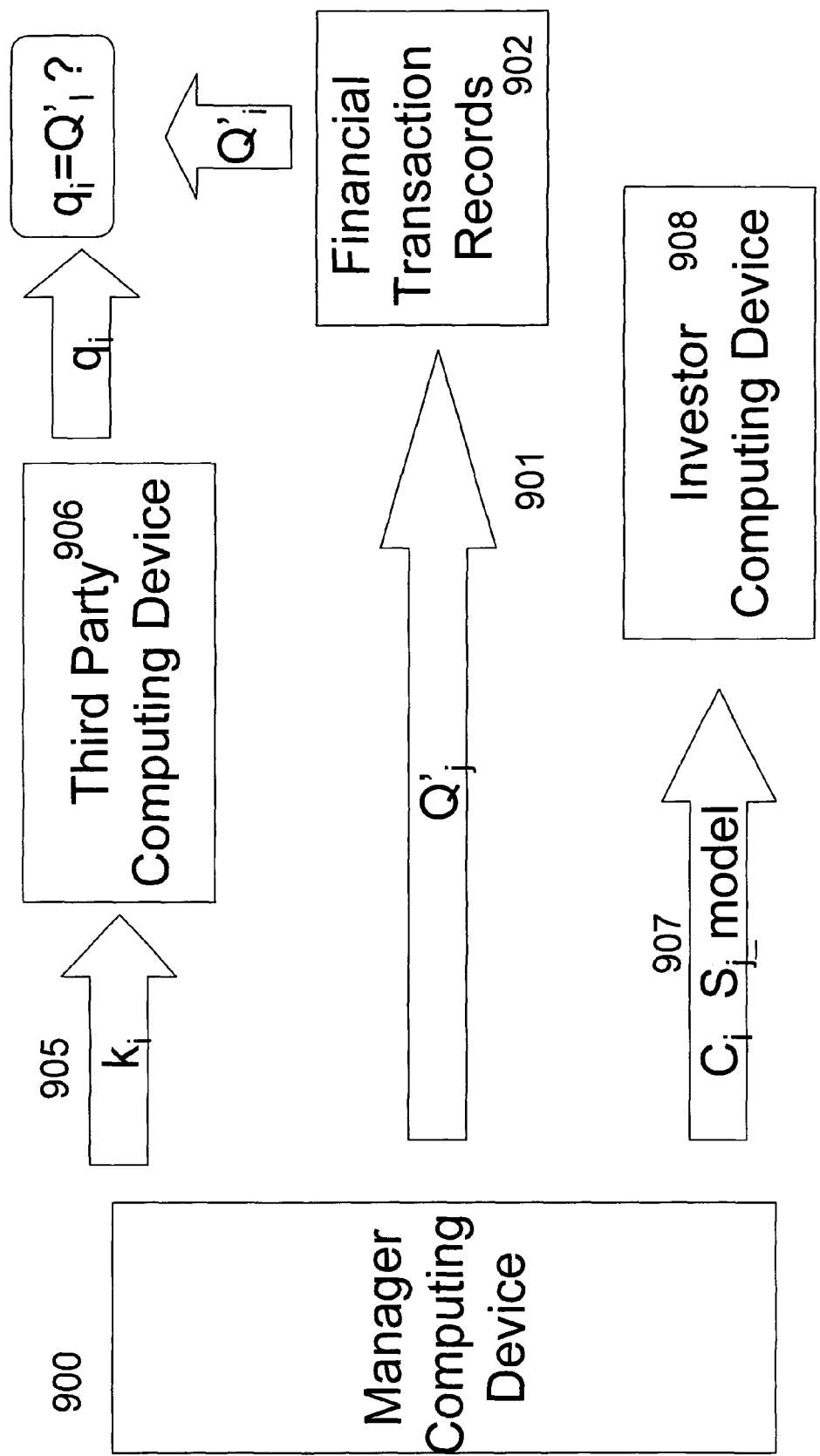
FIG. 9 illustrates an alternative embodiment using cryptographic commitments in which zero-knowledge proofs are not employed to show how risk assertions can be verifiably communicated.

FIG. 9 illustrates an alternative embodiment in which zero knowledge proofs are not employed. Following the framework of the preferred embodiment, device (900) is possessed by the portfolio management and it contains the data comprising the actual asset quantities. The actual holdings $Q'_i$ are ultimately determined in terms of real world financial transactions (901) which are there may be external records (902) and evident thereof. The assertions $S_i$ to be proved are specified with the help of the investment contract or a financial model or both (907) and are sent to the to device (908) which is possessed by the investor with the description of any model employed. The commitments to the asset quantities $C_i$ (907) may be generated on device (900) and are sent to device (908) which is possessed by the investor and additionally sent to to device (904) possessed by the third party. Device (908) retains records of the assertions $S_i$ and any financial model data referred to therein. Device (900) is possessed by the portfolio management may also send decryption keys $k_i$ to the commitments to the asset quantities $C_i$ to device (905) possessed by the third party (906) which may or may not be distinct from third party device (904). The one or more third parties may decrypt the committed asset quantities $q_i$ and compare them (909) to the actual quantities $Q'_i$ recorded or evidenced in external records (902), verifying their correctness. At any subsequent time at which the asset quantities $q_i$ are available, the correctness of the assertions $S_i$ retained by device (908) can be verified with the possible assistance of the financial model (907).

Another example of an alternative embodiment is a modification of the preferred embodiment or simplified embodiment employs multiple third parties. Instead of delivering committed asset quantities to a single third party a portion of the committed asset quantities may be delivered to each of the participating third parties. At a subsequent time the third parties may decrypt the committed asset quantities and verify them with respect to external records. This may be useful since even during such a verification step no single third party will learn the entire portfolio contents.

Within the field of finance there are multiple mathematical techniques of constructing mathematical commitments and multiple mathematical techniques of constructing zero knowledge proofs; the core of the invention is flexible enough to be implemented with any such alternate building blocks. Similarly, the zero knowledge statements that conveniently describe portfolio characteristics might make use of a linearity property of commitments and zero knowledge proofs as in the preferred embodiment, but the zero knowledge statements concerning risk or portfolio contents need not be limited to statements of this kind. For example, a one-way function such as a hash function to commit to the asset quantities.

An example of an assertion containing a quadratic function of quantities $q_i$ of assets $A_i$ may be useful for communicating a bound on variance of the portfolio's value. A common technique in portfolio risk management is to compute the variance of a portfolios value. Such models input each asset type type $A_i$ into a financial risk model which calculates the variance of each asset $d_{ii}$ and covariances among pairs of distinct assets $d_{ij}$ to produce a collection of risk data represented in a covariance matrix. Typical risk models compute variances and covariances in terms of a number of risk factors, exposures of each asset to risk factors, variances of the risk factors and covariances among risk factors. The covariance matrix obtained from such a model is combined with asset quantities to obtain the variance of the portfolio's value, expressed in the formula sum $\Sigma\ d_{i,j}\ b_i b_j$. This variance is among the most common risk statistics cited by investment professionals skilled in the art of measuring portfolio risk. It may be also desirable to verifiably communicate this type of risk statistic to an investor without revealing the actual asset quantities.

Figure 7:
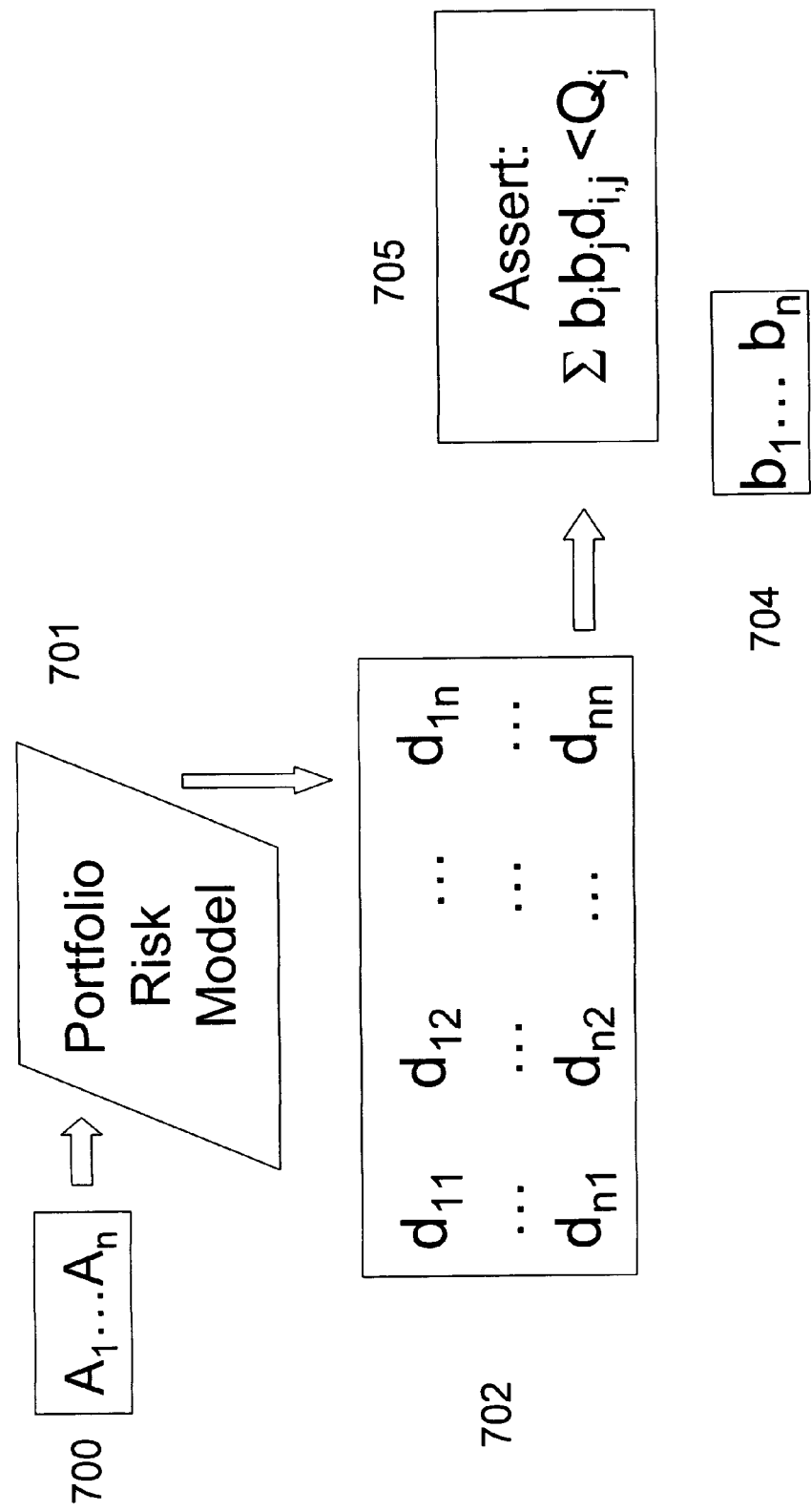
FIG. 7 illustrates a procedure to construct an assertion about a quadratic combination of the asset quantities so as to bound the portfolio's variance in terms of a model which measures the exposure of individual assets to said factor and the variance of the factors and covariances among the factors.

FIG. 7 illustrates a procedure to construct an assertion about a quadratic combination of the asset quantities so as to bound the portfolio's variance in terms of a model which measures the exposure of individual assets to said factor and the variance of the factors and covariances among the factors. For each asset type $A_i$ (700) a financial risk model (701) is used to calculate the variance of each asset $d_{ii}$ (702) and covariance of pairs of distinct assets $d_{ij}$ (702) to produce a covariance matrix (702). The financial risk model (701) may be a multi factor risk model as employed by those skilled in the art. The assertion (705) is defined in terms of these valuations; the secret asset quantities $b_i$; (704) and a bound on the sum $\Sigma\ d_{i,j}\ b_i b_j$, This proof indicates that the portfolio has been managed in way that the variance is bounded above by a specific value.

The order, form, and frequency of the messages sent to the parties involved in the risk-communicating messages may also take multiple forms. For example there may be additional parties involved besides the investor, managers, and third party. A number of intermediary parties might be present to facilitate the communication, assist in the computation, or enhance the verifiable nature of the risk statements. Additionally each message or data item may be digitally timestamped. Each message and data item may also be digitally signed. The present invention is intended to include these alternate configurations wherein an investor is able to verifiably learn some information about a portfolio or its risks, without requiring the complete disclosure of the evolving investment portfolio.

The order, form, and frequency of the messages sent to the regulatory agencies or third parties might differ from the preferred embodiment as well. One example is the inclusion of one or more parties to store committed portfolio information, share it with regulatory agencies appropriately, control its access, timestamp it, and ensure its long term integrity. Another example is a party which will make public the evolving portfolio contents after a pre-specified period of time, for example so that sensitive information relevant to market trading is not lost, yet later legal scrutiny can proceed uninhibited. Another example is the use of multiple third parties to store, compute with, or verify the committed asset quantities. This may be useful in case it is undesirable to reveal the entire portfolio to a single third party.

There may be other embodiments of this invention, which include any type of commitment to an investment portfolio which can be verified independently, or by a designated verifier, and any type of cryptographic technique which proves properties about the asset quantities of a portfolio.

The invention claimed is:

1. A computer-implemented method for communicating characteristics of an investment portfolio for verification that the investment portfolio meets at least one assertion of asset quantities without disclosing the exact composition of the portfolio, the method comprising executing, on at least one computer, computer executable instructions for:
   generating at least one commitment, wherein each commitment is a hidden binding representation that an investment portfolio comprises a certain asset quantity;
   generating a proof for the at least one assertion based upon the at least one commitment; and
   communicating the at least one commitment and the proof to a recipient.

2. The method of claim 1 wherein the at least one assertion includes a measure of investment risk in the portfolio.

3. The method of claim 1 wherein the at least one assertion includes an assertion that a predetermined function of a quantity of an asset in the investment portfolio satisfies a specified relation to a numerical value.

4. The method of claim 3 wherein the predetermined function includes a measure of investment risk in the portfolio.

5. The method of claim 1 wherein the at least one assertion comprises a commitment that the investment portfolio comprises a limit of a total quantity of assets within a category of assets.

6. The method of claim 1 wherein the at least one assertion comprises a commitment that the investment portfolio comprises a limit on a total value of assets within a category of assets.

7. The method of claim 1 wherein the at least one assertion comprises a valuation of an asset in the investment portfolio under a hypothetical scenario.

8. The method of claim 7 further comprising the step of publishing the valuation of the asset under a hypothetical scenario on at least one electronic device.

9. The method of claim 1 wherein the at least one assertion comprises a numerical value representing an exposure of an asset in the investment portfolio to a specified risk factor.

10. The method of claim 9 further comprising the step of publishing the numerical value on at least one electronic device.

11. The method of claim 1 wherein the at least one assertion includes a variance of the portfolio.

12. The method of claim 1 further comprising the step of publishing the at least one assertion on at least one electronic device.

13. The method of claim 1 further comprising the step of publishing the at least one assertion in a printed description of an investment fund agreement.

14. The method of claim 1 wherein the at least one commitment is computed using a cryptographic encryption function.

15. The method of claim 1 wherein the at least one commitment is computed using a cryptographic encryption function with an algebraic homomorphic property.

16. The method of claim 1 wherein the at least one commitment is computed using a cryptographic commitment function.

17. The method of claim 1 wherein the at least one commitment is computed using a cryptographic commitment function with an algebraic homomorphic property.

18. The method of claim 1 wherein the proof includes a cryptographic interactive proof.

19. The method of claim 1 wherein the proof includes a cryptographic non-interactive proof.

20. The method of claim 1 wherein the proof includes a cryptographic zero knowledge proof.

21. The method of claim 1 wherein the proof includes a cryptographic minimal knowledge proof.

22. The method of claim 1 wherein the proof includes a cryptographic proof that a committed integer lies within a specified interval.

23. The method of claim 1 wherein the proof includes a cryptographic technique which derives a commitment to a function of the asset quantities from the commitments to the asset quantities.

24. The method of claim 1 further comprising the step of communicating a key to at least one of the at least one commitment.

25. An apparatus for generating information concerning characteristics of an investment portfolio comprising a computer readable medium with executable instructions for:

generating at least one commitment, wherein the at least one commitment is a hidden binding representation that an investment portfolio comprises a certain asset quantity; and generating at least one assertion of asset quantities comprised in the investment portfolio.

26. The apparatus of claim 25 wherein the computer readable medium further comprises executable instructions for generating a proof for the at least one assertion based upon the at least one commitment.

27. The apparatus of claim 25 wherein the computer readable medium further comprises executable instructions for communicating the at least one commitment and the at least one assertion to another electronic device.

28. The apparatus of claim 25 further comprising a security device for restricting access to the at least one commitment and at least one assertion.

29. The apparatus of claim 25 wherein the computer readable medium further comprises executable instructions for digitally signing at least one of the at least one commitment and at least one assertion.

30. The apparatus of claim 25 wherein the computer readable medium further comprises executable instructions for digitally time stamping at least one of the at least one commitment and at least one assertion.

* * * * *